(12) United States Patent
Hotz

(10) Patent No.: US 8,156,143 B2
(45) Date of Patent: Apr. 10, 2012

(54) SYSTEM AND METHOD OF RECONCILING HUMAN RESOURCE DATABASE

(75) Inventor: Thomas Hotz, Bruchsal (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/908,203

(22) Filed: Oct. 20, 2010

(65) Prior Publication Data
US 2011/0035408 A1 Feb. 10, 2011

Related U.S. Application Data

(62) Division of application No. 11/956,980, filed on Dec. 14, 2007, now Pat. No. 7,840,562.

(51) Int. Cl.
*G06F 17/30* (2006.01)
(52) U.S. Cl. ........................................ 707/773
(58) Field of Classification Search ........... 707/758–780
See application file for complete search history.

(56) References Cited

U.S. PATENT DOCUMENTS

| | | | | |
|---|---|---|---|---|
| 5,715,397 A * | 2/1998 | Ogawa et al. | ................. | 709/246 |
| 2002/0147668 A1 * | 10/2002 | Smith et al. | ...................... | 705/30 |
| 2002/0188480 A1 * | 12/2002 | Liebeskind et al. | .............. | 705/4 |
| 2003/0225638 A1 * | 12/2003 | Secola | ............................ | 705/30 |
| 2005/0027507 A1 * | 2/2005 | Patrudu | ............................ | 704/1 |
| 2005/0192979 A1 * | 9/2005 | Keller et al. | .................... | 707/100 |
| 2007/0250379 A1 * | 10/2007 | Pappas et al. | ..................... | 705/11 |
| 2007/0255656 A1 * | 11/2007 | Olson et al. | ..................... | 705/40 |
| 2007/0265901 A1 * | 11/2007 | Olson et al. | ....................... | 705/8 |
| 2008/0021799 A1 * | 1/2008 | Blowers | ......................... | 705/30 |
| 2008/0082575 A1 * | 4/2008 | Peter et al. | ................ | 707/103 Z |
| 2008/0235365 A1 * | 9/2008 | Bansal et al. | ................ | 709/224 |

* cited by examiner

*Primary Examiner* — Wilsone Lee
(74) *Attorney, Agent, or Firm* — Kenyon & Kenyon LLP

(57) ABSTRACT

A system and method to reconcile Human Resource databases, including payroll, accounting, tax and travel databases, are provided. The system and method may include a database aggregation component that automatically gathers and stores a plurality of databases in a corporation business information system wherein these databases may be logically related to each other and a database reconciliation component that is capable of querying a database for retrieving data entries based on user instructions or on requests automatically generated according to preset conditions. The reconciliation method may further compare data from logically related databases. If discrepancies exist in a comparison result, the method may provide a drill-down step where data at next level of detail may be retrieved according to automatically generated queries. This reconciliation process of comparison and drill-down for more detail may continue until a preset condition is satisfied or there is no further detail to retrieve. The system may produce a report relating to the reconciliation results.

8 Claims, 10 Drawing Sheets

400

600

| Payroll posting document | | | | | | | | | Payroll Result | | | |
|---|---|---|---|---|---|---|---|---|---|---|---|---|
| Runid | Doc. no | Docline no. | GL A/C | Amount | Pernr | Seq. no | Wage type | Amount | Pernr | Seq. no | Wage type | Amount |
| 0001 | 0001 | 0001 | Z0001 | 10000 | 135001 | 0001 | M010 | 10000 | 135001 | 0001 | M010 | 10000 |
| | | 0002 | Z0002 | 15000 | 135001 | 0001 | M020 | 10000 | 135001 | 0001 | M020 | 10000 |
| | | | | | 135001 | 0001 | M030 | 5000 | 135001 | 0001 | M030 | 5000 |
| 0002 | 0001 | 0001 | Z0001 | 10000 | 135002 | 0002 | M010 | 10000 | 135002 | 0002 | M010 | 10000 |
| | | 0002 | Z0002 | 15000 | 135002 | 0002 | M010 | 15000 | 135002 | 0002 | M010 | 15000 |
| | | 0003 | Z0003 | 5000 | 135002 | 0002 | M020 | 5000 | 135002 | 0002 | M020 | 5000 |

Data for off cycle run not posted to accounting

702

| Payroll posting document ||||||||| Payroll Result ||||
|---|---|---|---|---|---|---|---|---|---|---|---|
| Runid | Doc. no | Docline no. | GL A/C | Amount | Pernr | Seq. no | Wage type | Amount | Pernr | Seq. no | Wage type | Amount |
| 0001 | 0001 | 0001 | Z0001 | 10000 | 135001 | 0001 | M010 | 10000 | 135001 | 0001 | M010 | 10000 |
|  |  | 0002 | Z0002 | 15000 | 135001 | 0001 | M020 | 10000 | 135001 | 0001 | M020 | 15000 |
|  |  |  |  |  |  |  |  |  | 135001 | 0002 | M030 | 5000 |
| 0002 | 0001 | 0001 | Z0001 | 10000 | 135002 | 0002 | M010 | 10000 | 135002 | 0002 | M010 | 10000 |
|  |  | 0002 | Z0002 | 15000 | 135002 | 0002 | M010 | 15000 | 135002 | 0002 | M010 | 15000 |
|  |  |  |  |  |  |  |  |  | 135002 | 0003 | M020 | 5000 |

Data for the personnel no. not posted to accounting

| Payroll posting document ||||||||| Payroll Result ||||
|---|---|---|---|---|---|---|---|---|---|---|---|
| Runid | Doc. no | Docline no. | GL A/C | Amount | Pernr | Seq. no | Wage type | Amount | Pernr | Seq. no | Wage type | Amount |
| 0001 | 0001 | 0001 | Z0001 | 10000 | 135001 | 0001 | M010 | 10000 | 135001 | 0001 | M010 | 10000 |
|  |  | 0002 | Z0002 | 15000 | 135001 | 0001 | M020 | 10000 | 135001 | 0001 | M020 | 10000 |
|  |  |  |  |  | 135001 | 0001 | M030 | 5000 | 135001 | 0001 | M030 | 5000 |
|  |  |  |  |  |  |  |  |  | 135002 | 0002 | M010 | 10000 |
|  |  |  |  |  |  |  |  |  | 135002 | 0002 | M010 | 15000 |
|  |  |  |  |  |  |  |  |  | 135002 | 0002 | M020 | 5000 |

| FI | | | Travel Management | | |
|---|---|---|---|---|---|
| G/L Acct | Cal Month | Amt | G/L acct | Cal Month | Amount |
| 610001 | May 2006 | 3000 | 610001 | May 2006 | 3000 |
| | June 2006 | 1000 | | June 2006 | 1000 |
| | Total | 4000 | | Total | 4000 |
| 634010 | May 2006 | 0 | 634010 | May 2006 | 4300 |
| | June 2006 | 4000 | | - | - |
| | Total | 4000 | | Total | 4300 |

1002

Drilldown on G/L accounts where amounts are not matching (in red)

There has been a manual posting in FI; hence there is a mismatch between FI and Payroll Posting Documents Document not posted from Travel to FI, hence FI shows Amount as 0

1004

| FI | | | | | | | Travel Management | | | | |
|---|---|---|---|---|---|---|---|---|---|---|---|
| G/L acct | Cal Month | Doc no. | Source | Post date | Amt | Doc type | G/L acct | Cal Month | Doc no. | Post date | Amt |
| 610001 | May 2006 | 3132 | Travel | 21-05-2006 | 3000 | Posting | 610001 | May 2006 | 5667 | 21-05-2006 | 3000 |
| 610001 | June 2006 | 3138 | Travel | 21-06-2006 | 1000 | Posting | 610001 | June 2006 | 5674 | 21-06-2006 | 1000 |
| | | | | Total | 4000 | | | | | | 4000 |
| 634010 | May 2006 | - | - | - | 0 | Posting | 634010 | May 2006 | 7245 | 21-05-2006 | 4300 |
| | | | | Total | 0 | | | | | Total | 4300 |
| 634010 | June | 4151 | Travel | 21-06- | 2000 | Posting | 634010 | June 2006 | 7247 | 21-06- | 2000 |

Fig. 10

SYSTEM AND METHOD OF RECONCILING HUMAN RESOURCE DATABASE

CROSS-REFERENCE TO RELATED APPLICATIONS:

This is a Divisional Application of U.S. Utility application Ser. No. 11/956,980, filed Dec. 14, 2007, which is incorporated herein in its entirety.

BACKGROUND

Companies may need to ensure the accuracy and consistency of financial data stored in enterprise databases. Examples of such databases may include Human Resource ("HR") payroll, payroll posting, General Ledger ("G/L") accounts, tax, and travel management. Two databases may be logically related when a data field in a first database is logically related to a data field in a second database. A first data field is logically related to a second data field when the data recorded in the first and the second data field may be traced to a common original event. Examples of common original events may include monthly salary payment to an employee and associated payroll deductions, an expense debit for a group of employees, or an employee's travel expense and reimbursement for a month. In another example, after the travel expense reimbursement for an employees' business trip was processed, the controller of the corporation may receive an overview of the amount that was paid out in comparison to the amount that was requested to be reimbursed. In such a situation, the first data field may include the amount that the employee requested to be reimbursed and the second data field may include the amount actually reimbursed to the employee, where the business trip is the common original event for both data fields, and therefore, they are logically related. When data are recorded in logically related databases, the data may have discrepancies for a number of reasons. For example, monthly payroll data for an employee may differ from corresponding monthly payroll posting data in finance accounting because the data for the employee may not be posted to the payroll accounting at the time of comparison due to off days. In another example, data in a tax database may differ from corresponding data in a payroll posting database with respect to a tax code due to lack of coordination between the two databases. Companies may need to report and explain any discrepancies among logically related databases to internal and external authorities by regulation or by law.

Currently, there is no standard tool to automatically reconcile and report discrepancies in logically related databases. Instead, individual software applications generate tables of data in separate reports. As a result, to reconcile databases, these reports are compared manually by human resource or accounting experts, a process that is time consuming and prone to human errors.

Current HR management systems in marketplace do not have the capability of reconciling diverse databases in an enterprise business information system. There is a great need for system and method that automate the database reconciliation process.

BRIEF DESCRIPTION OF THE DRAWINGS OF THE EXAMPLE EMBODIMENTS

FIG. 6 shows one example result of Human Resource database reconciliation system involving a payroll database and a payroll posting database.

FIG. 7a shows one example screen shot of Human Resource database reconciliation system involving a payroll database and a payroll posting database according to one example embodiment of the present invention.

FIG. 7b shows another example screen shot of Human Resource database reconciliation system involving a payroll database and a payroll posting database according to one example embodiment of the present invention.

FIG. 10 shows example screen shots of Human Resource database reconciliation system involving a financial database and a travel management database according to one example embodiment of the present invention.

DETAILED DESCRIPTION

Figure 1:
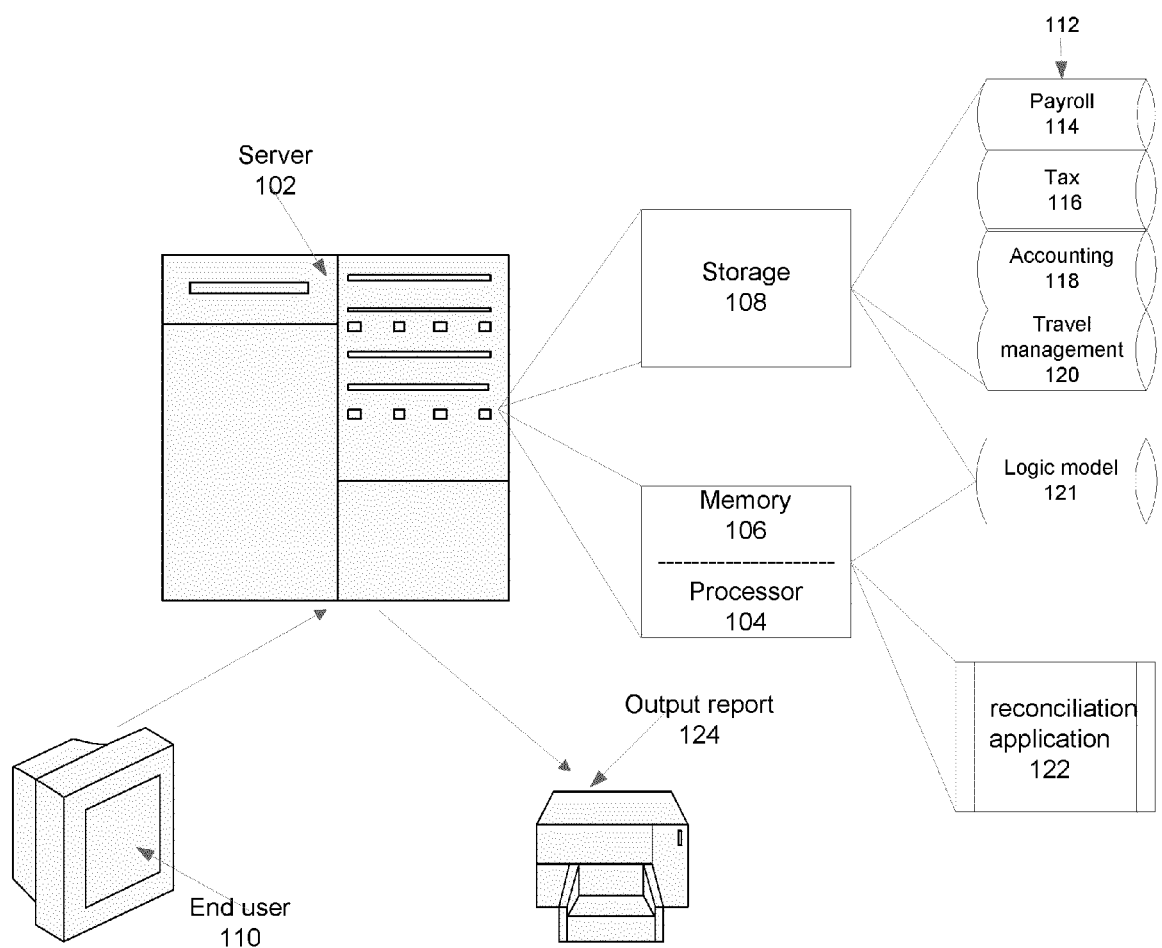
FIG. 1 shows one example Human Resource database reconciliation system according to one example of the present invention.

Embodiments of the present invention allows a corporation to automatically reconcile its Human Resource ("HR") databases existing in a corporation's business information system. A server, for example, SAP® ERP, may provide a storage platform for these databases critical to the operation of the corporation. These databases, commonly including HR payroll, payroll posting, accounting, tax and travel management, may result from running instructions stored in a memory on a digital processor. Because of the difference in the purpose and timing of entering data into these databases, discrepancies may exist between data stored in two logically related databases or different versions of a database. However, internal corporate governance, such as account auditing, or external legal authority, such as tax authorities in different countries, may require a corporation to ensure the accuracy and consistency of data stored in logically related databases. Under an instruction from a user or at preset schedules, embodiments of the present invention may run a reconciliation application stored in the memory on the digital processor. The application may compare data stored in logically related databases and drill down on any discrepancies for further explanation. The reconciliation may be implemented on SAP business information management platforms such as SAP ERP or SAP NetWeaver® for corporations using SAP solutions for all relevant applications, or may be implemented in a combination of SAP HR applications with Financial Accounting ("FI") applications supplied by another vendor.

An embodiment of the present invention provides a logic model containing relational information between different databases. The logic model may also contain relational information between data fields in a database and a user specified request. The logic model may be implemented as a matching table between data fields in a first database and data fields in a second database. It may also be implemented as a function such that data contained in a data field in a first database is related to data in a single data field in the second database or data in multiple data fields in a second and/or first database. The first and second database that need to be reconciled may be accessed in the storage by executing instructions in the digital processor.

A user of the reconciliation system, commonly a person who has the responsibility for the integrity of corporate financial information, may enter a request for reconciliation of a first database against a second database. The first and the second database may include any one of the HR payroll, payroll posting, accounting, tax and travel databases. Also under certain circumstances as mandated by laws or regulations, a request for reconciliation may be automatically generated at a preset time or in response to a specified event. For example, the reconciliation system may send out a request for reconciling HR payroll with accounting at the end of each month, or send out a request for reconciling accounting with tax in the event of an internal or external tax auditing. Based on the information contained in a request, the system may initiate a query for retrieving data from the first and the second database. The query may be constructed explicitly based on the need of reconciliation, or implicitly based on the nature of the reconciliation event. For example, if a request is made to reconcile the payroll data of a particular employee over a specific period of time between payroll result and payroll posting in accounting, a query may be generated based on the explicit information regarding that employee. In another example, if the request is made to reconcile as mandated by a tax regulation, the system may look up the logic model for data fields relating to the tax regulation and generate a query containing a list of data fields relating to the tax regulation. Using the query, the reconciliation application may retrieve data from logically related data fields in the first and the second database in the storage. At an initial step, data fields may be retrieved at corporate level in the form of sums of individual business units.

In an embodiment of the present invention, logically related data fields at corporation level from the first and the second database may be compared with each other. The comparison may be a direct one-to-one comparison between data in a data field in the first database and a corresponding data in a logically related data field in the second database. The comparison may also be an one-to-many comparison of data in a data field in the first database against data in multiple data fields in the second database, or against data in more than one database, for example, the first and the second database. The comparison may be a many-to-many comparison of data from multiple data fields in the first database against data from multiple data fields in the second database. The value of data in a data field may be numerical type or symbolic type. The comparison may be in terms of difference, Euclidean distance or other forms of distance metrics, between two data. The comparison result may show a match or a discrepancy. The comparison result may indicate a match if the comparison result meets a preset criteria, for example, the distance between two data is less than a preset threshold value. If the comparison result shows a match between the two logically related databases under mandates imposed by internal and external authorities, the reconciliation application may end and generate a report to the authorities. On the other hand, if the comparison result shows a discrepancy, for example, the distance between data in two logically related data fields is larger than a preset threshold, the reconciliation application may then drill down on the discrepancies to locate the source for discrepancies. To this end, the reconciliation application may generate a new query requesting more data at a higher level of detail for data fields that have discrepancies between logically related databases. A higher level of detail may show more data fields than a lower level of detail. For example, if the total pay for a business unit according to a first version of payroll database is different from that for the same business unit in a second version of payroll posting database for a month, the reconciliation application may generate a query for payroll data as broken down to sub business units. Then the reconciliation application may retrieve data from the first and the second database at the sub business unit level and compare the data at that level. The reconciliation application may repeat these two steps of comparison and drill-down recursively until there is no further level of details in the first and the second database, or the reason for the discrepancy is found to satisfy a preset condition.

An embodiment of the present invention may generate a report according to the result of reconciliation. The report may be formulated based on legal requirements for corporate disclosure including the origin and the reason for discrepancies. For example, a tax regulation may require a report specifying discrepancies in taxable deductions in each employee pay check. Therefore, at the end of a reconciliation between payroll and tax databases, a report may be generated for tax authorities with details relating to discrepancies (if any) in each and every employee salaries. Even when the databases match each other, the reconciliation application may still generate a report showing that each data field in first database is matched to a corresponding data field in the second database according to law or regulation.

An embodiment of the present invention may build the logic model according to tax information gathered from historical data and up-to-date tax regulations. A corporation may need by law or regulation to file tax reports based on its financial data including revenue and expense data. Expense data may be recorded in the forms of General Ledger (G/L) account, employee payroll, or travel. A logic model containing information relating data fields in databases to tax regulations may be built based on historical data and previous experience with the tax regulation. Moreover, tax regulation may change each year in response to tax legislations. The logic model may also be updated according to tax regulation changes. The logic model may specify for a particular tax regulation the type of data that needs to be reconciled and reported to authority. Therefore, the reconciliation application may automatically generate a query for retrieving all relevant data relating to a tax request based on the logic model. The logic model may be created in advance of the reconciliation and be updated periodically or according to changes in tax regulations.

An example variant of the present invention may provide a method to automatically generate a query for retrieving data from the first and the second database. In one example, where the user may issue an instruction to reconcile a first database against a second database for a particular type of data over a specific period of time, a query for retrieving data relating to the type of data may be automatically generated based on information in the logic model. For example, the user may instruct to reconcile the payroll information for a group of employees over a year against payroll posting information for the same employees over the same year. A query may be generated based on a mapping relation between data fields in the payroll database and the payroll posting database so that a data retrieval in the first database results in a retrieval of corresponding data in the second database. In another example, an automatic request to reconcile financial data according to a tax regulation at the end of a month may trigger the reconciliation application to automatically construct a query based on information in the logic model relating to the tax regulation.

An example of the present invention reconciles a first database containing a first version of payroll information and a second database containing a second version of payroll information. Different versions of payroll information may be stored in different corporate business information databases for a number of reasons. One version may be created and maintained by the HR payroll department while another version may be created and maintained by the accounting department. The two versions of payroll database may have discrepancies because they may be updated at different times for different purposes. Corporations under internal and external legal mandates may need to reconcile these different versions of a database. The reconciliation between different versions of payroll data is also called cross-validation of payroll. For example, when payroll department would like to get a list of employees whose tax statutory deductions have discrepancies between employee deduction and employer deduction, data from a list of data fields may be extracted. In a SAP Business Information ("BI") system, an embodiment of the present invention may contain columns for field names, field descriptions, a table of origins and, fields in the table of origins. Field names may include a list of unique names for data fields which are correspondingly described in field description column. Examples of fields include "from data, sequential number," "payroll area," "for-period for payroll," "start date of payroll period (for period)," "end of payroll period (for period)," "in-period for payroll," "end of payroll period (in period)," "legal person, payroll type," "reversal indicator," "date of payroll run," "pay date for payroll result," "reversal indicator," "out-of-sequence check indicator," "create out-of-sequence check (account to payroll control record)," "personnel number," "country grouping," "business area," "controlling area of master cost center," "company code," "employee group," "employee subgroup," "position, master cost center," "organizational unit," "personnel area," "personnel subarea," "time management status," "expenditure type," "financial management area," "fund," "funds center," "commitment item," "controlling area," "debited activity type," "debited activity," "debited business area," "debited cost center," "debited company code," "debited network," "debited order," "debited element," "debited fund center," "debited commitment item," "debited fund," "national assignment indicator," "variable assignment number," "information variable assignment," "wage type," and "currency key." The table of origins may include a list of original directories as described in fields in the table of origin from which data fields may be stored. In an embodiment of the present invention, an origin directory may contain a single field name or no field name. In another embodiment, an origin directory may contain multiple field names. A comparison of all or a subset of these data fields for a particular employee over a specific period of time may show discrepancies between the first payroll database and the second payroll posting database.

An example of the present invention may reconcile any one of a first database including a payroll database, a tax database, an accounting database and a travel database against any one of a second database including a payroll database, a tax database, an accounting database and a travel database. For example, the tax database may need to reconcile with the payroll database so that all statutory payroll deductions sent to the government are not only correctly reported, but also correctly withheld and submitted. Therefore, reconciliation application may need payroll information relating to each employee including salary and other types of deductions including social security deduction, medical insurance deduction, and flexible spending deduction.

In another embodiment of the present invention, a payroll database may be reconciled with accounting data posted to Financial Accounting ("FI"). In an example variant of the embodiment, the payroll may be reconciled with the accounting interface between payroll and FI. Since payroll results commonly contain information that may be relevant for accounting, they may need evaluation before being posted to FI. HR commonly provides an accounting interface to perform the task of evaluating payroll data. The accounting interface may create intermediate accounting documents that may be posted to accounting. A reconciliation between payroll data and the intermediate documents may be required before posting the intermediate documents to FI because HR may transfer only summarized data to FI. In an example variant of embodiment, accounting may require the information from payroll for paying wages or salaries to employees. A preliminary data medium exchange program ("Pre-DME") in HR evaluates the payroll results and prepares the payment information which accounting uses to make payments to employees. Before transmitting this information to the accounting, this information is validated against the bank transfer for each employee as calculated by payroll.

In another example of the present invention, payroll may be reconciled directly with accounting data in Financial Accounting and Controlling ("FI/CO"). The purposes of this type of accounting reconciliation are to check the integrity of accounting documents, to satisfy legal reporting and auditing, to check outgoing payables with payroll, and to review expenses for a particular financial entity including cost centers or fund centers.

In an embodiment of the present invention, payroll may be reconciled with travel expense database. Travel related payroll deductions may be limited by law and regulation. Also, travel expense reimbursement to employees may be the source of discrepancies in different versions of payroll databases.

An embodiment of the present invention may execute reconciliation application for databases according to a preset schedule. For example, reconciliation between payroll and tax may be conducted bi-monthly for payroll, annual tax and pay card expenses in country specific tax report. Reconciliation for Employers contributions and cumulated payroll results may be conducted for annual tax statement. Reconciliation between payroll and accounting may be conducted annually for FI/CO result accounts and balance accounts, and bi-monthly for tax report. Reconciliation for employer's contribution may be conducted when financial data are posted to FI/CO. Reconciliation for travel management may be conducted for monthly or annual tax report.

FIG. 1 shows an example of a Human Resource ("HR") database reconciliation system according to an embodiment of the present invention. The system may include a server 102 including a processor 104, a memory 106 and a storage 108. The processor 104 may execute application instructions stored, for example, in the memory 106 based on a request from an end user 110 or automatically generated according to preset conditions stored in memory 106 or in storage 108. The execution of application may include processing data stored in the memory 106 or in the storage 108. The storage may include a database aggregation component 112 which may further includes a HR payroll database 114, a tax database 116, a Financial Accounting ("FI") database 118, and a travel management database 120. The HR database 114 may further include information relating to payroll results, tax reporting and an interface to accounting. The FI database 118 may further include accounting information. The storage 108 or the memory 106 may include a logic model 121 which contains relational information between databases or information relating to query construction. The system may include a component of database reconciliation application 122 implemented on a business information ("BI") system including SAP ERP or SAP NetWeaver® running on the processor 104. The database reconciliation application 122 retrieves data from the databases in the aggregation component 112 and further processes the retrieved data according to a set of logic relations stored in the memory 106 or in the storage 108. The reconciliation application eventually may output processed results in the form of reports 124 according to a set of requirements. These requirements may include those imposed by internal corporation governance under regulations or by law.

Figure 2:
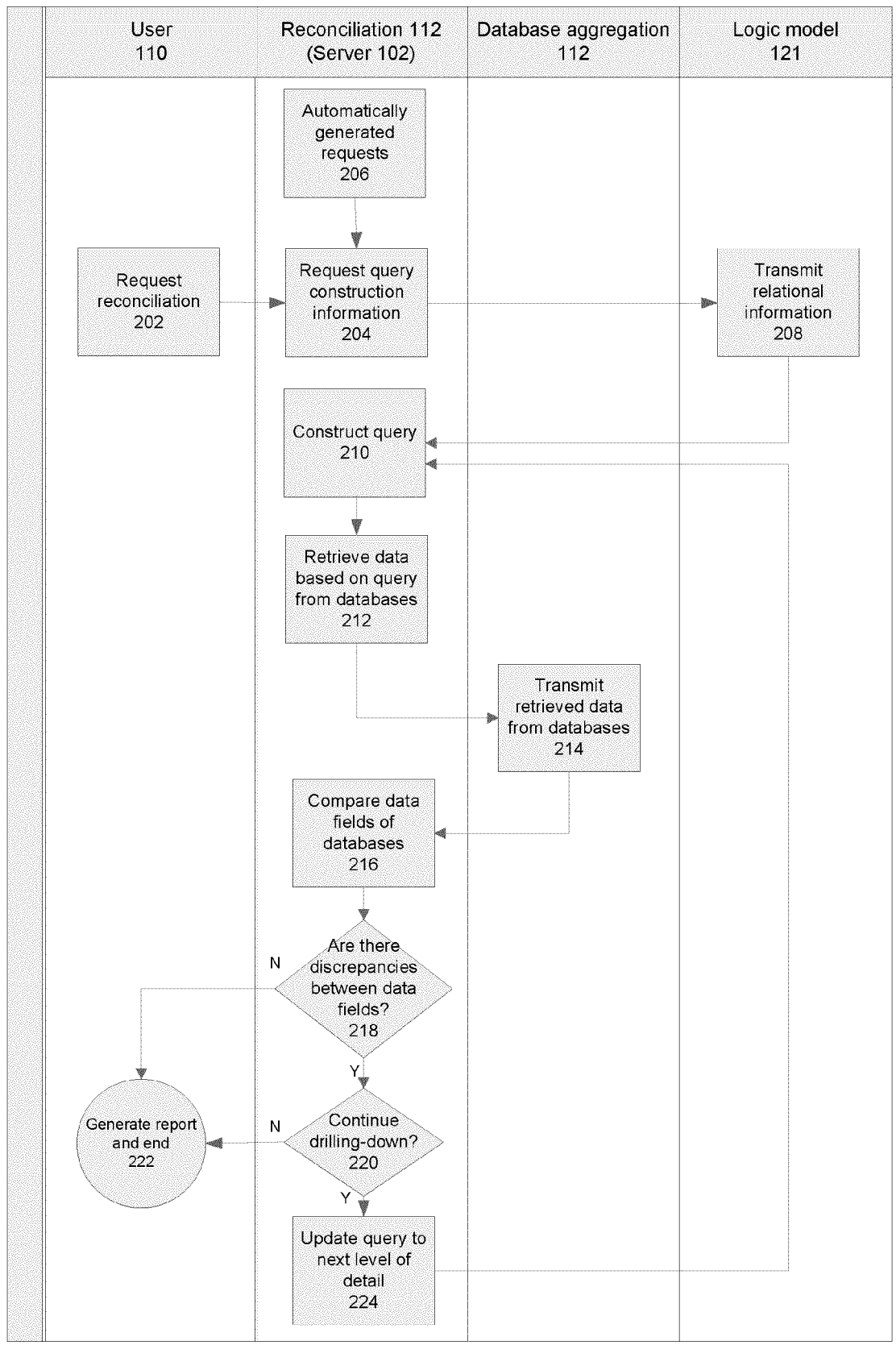
FIG. 2 shows one example flowchart of Human Resource database reconciliation method according to one example embodiment of the present invention.

FIG. 2 shows an example flowchart illustrating the process of HR database reconciliation according to an embodiment of the present invention. The flowchart illustrates the functionality of each component and the relationship between components in an embodiment of the HR database reconciliation. An end user 110 may request for a reconciliation of databases 202, or the reconciliation application 122 may automatically generate a request 206 for reconciliation according to preset conditions, for example, on the last day of each month or on the last day of each fiscal period, at a specific level of detail. An example initial level of detail may be at the corporate level. Other levels of detail may include business unit level, employee group level, or individual employee level. A request may further contain information relating to the types of reconciliation and databases to be performed on. Examples of type of reconciliation may include payroll, tax, accounting, and travel management reconciliation. Upon receiving a request, the reconciliation application 122 may request information 204 that is relevant to generate a query from a logic model 121. Based on the relational information transmitted 208 from the logic model, the reconciliation application 122 may construct a query 210 for retrieving data from HR databases. The reconciliation application 122 may then use the automatically generated query to retrieve data 212 from at least one database in the database aggregation 112. Examples of databases include a payroll database 114, a tax database 116, an accounting database 118 and a travel management database 120. The database aggregation component may transmit data 214 in logically related databases to the server. Examples of logically related data may include payroll data of an employee for a particular period of time stored in a payroll database 112 and the data for the same employee for the same period of time stored in a payroll posting document in an accounting database 118. Another example of retrieved data may include debit information of a specific account for a particular period in an accounting database 118 and data for the same account for the same period of time in a payroll posting database 112. The retrieved data may be in the form of a list data structure which contains a list of data fields each of which may contain a scalar data, or a vector data which contains a list of scalar data, or an array data which contains a matrix of scalar data, or a mixture of scalar data, vector data and array data. The value of a scalar data may be numerical or symbolic. The reconciliation application 122 may then compare data 216 retrieved from logically related databases for discrepancies caused by lack of coordination in creating and maintaining databases. The database reconciliation may generate a report 222 and end the reconciliation process if a comparison shows no discrepancy between logically related databases 218. If discrepancies exist between logically related databases, a further determination 220 may be made as to whether to further drill-down and compare the data at a higher level of detail, for example, to the group of employees level. When data are available at a higher level of detail and the nature of the request 202 calls for a detailed explanation for the discrepancies, a query-updating component 224 may generate new requests to the query construction component for retrieving data 210. The new query may be specifically targeted to retrieve data from those logically related data fields showing discrepancies, or the query may be generally for retrieving all data at next level of detail. The reconciliation application 122 may then repeat the reconciliation process until component 220 determines that there is no further details available in databases or that there is no need to drill-down on the data because the request 202 may be satisfied at present level of data detail.

Figure 3:
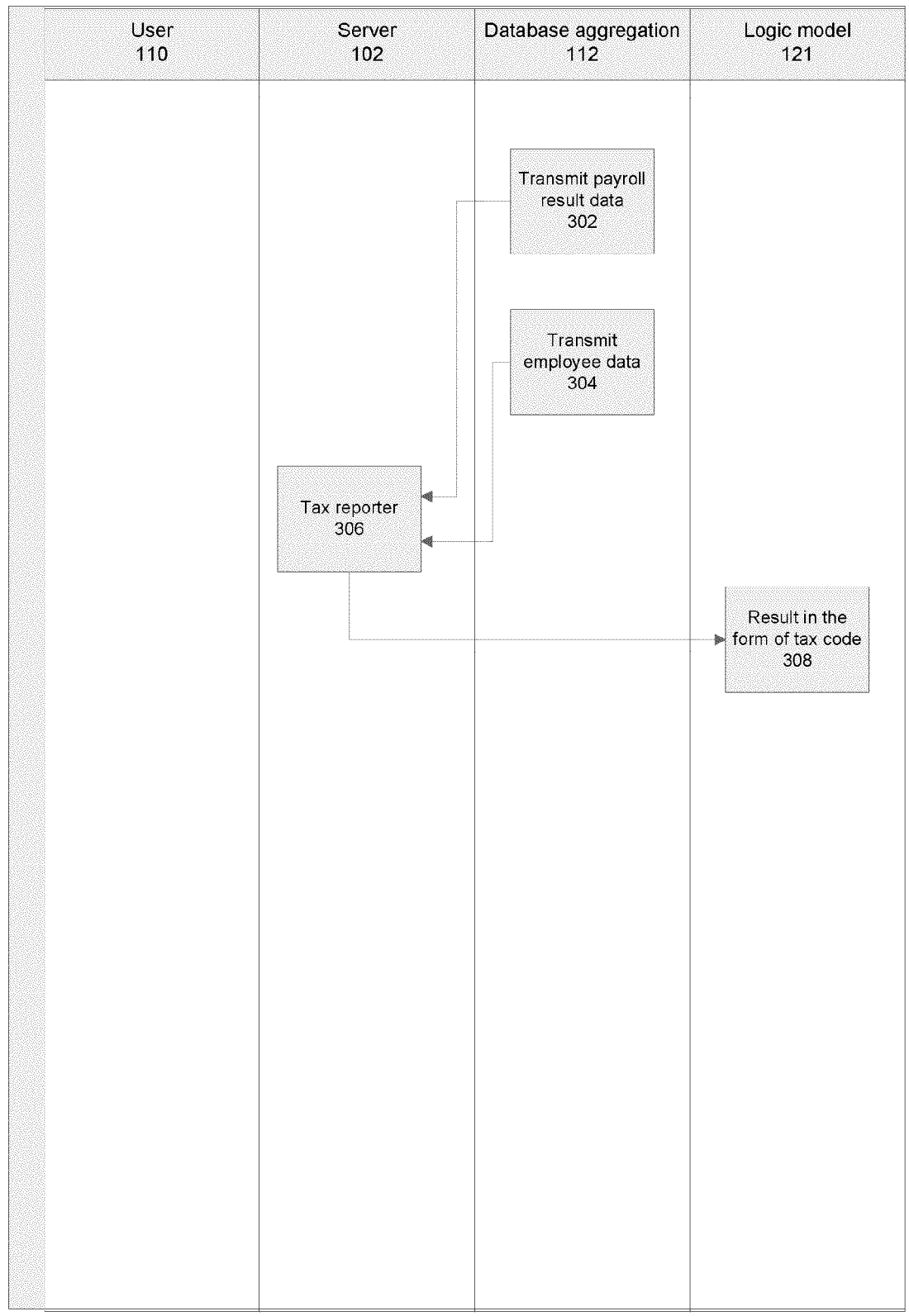
FIG. 3 shows one example flowchart of compiling a logic model according to one example embodiment of the present invention.

FIG. 3 shows an example flowchart illustrating a process for generating a logic model 121 according to an embodiment of the present invention. A logic model 121 may contain relational information needed for reconciliation in response to a particular request 201. A logic model 121 may be derived from a tax reporter 306 with information gathered from experience, for example, historical payroll result database 302 or employee/employer databases 304. A logic model 121 may also include statutory information relating to a country or regulations governing an industry, for example, U.S. tax statutes relating to employee payroll deductions. One example of logic model is a table that maps fields of data in a first database to a data field in a second database. Another example of logic model may include tax codes 308 in response to a request for payroll relating to tax information.

Figure 4:
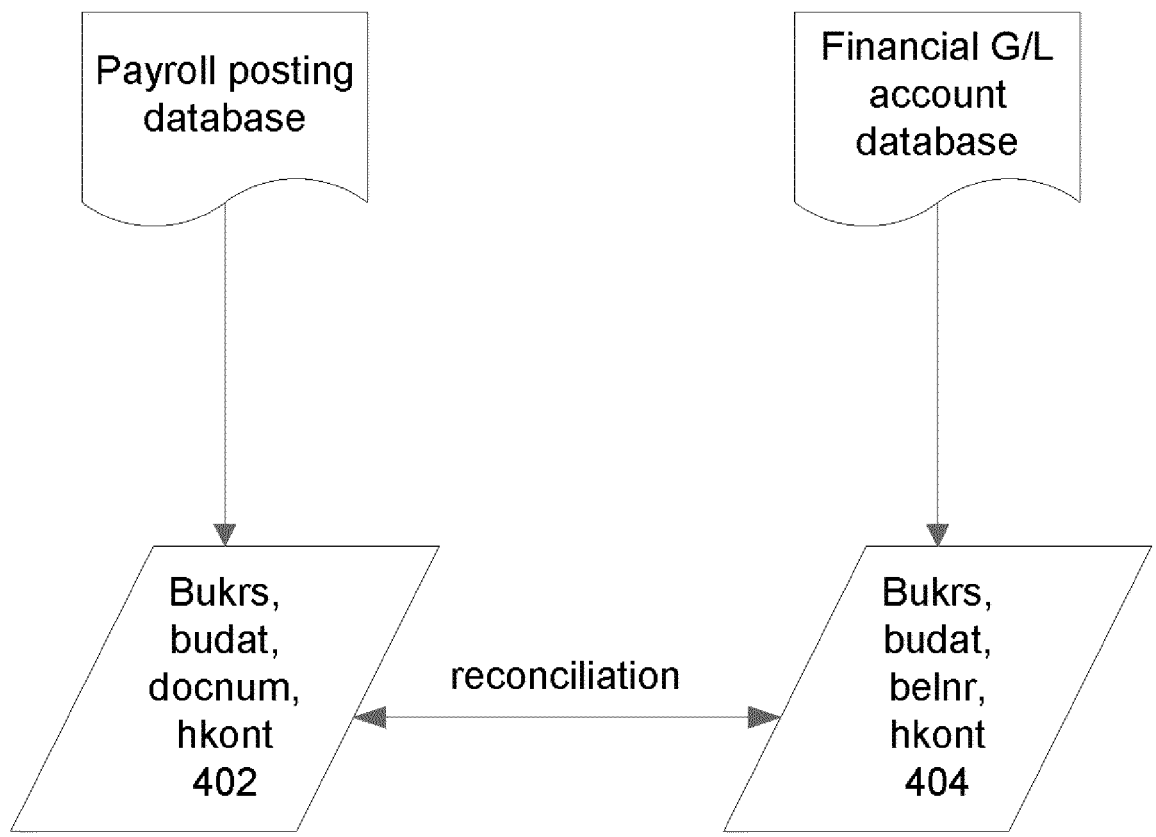
FIG. 4 shows one example flowchart of Human Resource database reconciliation method involving a payroll posting database and a financial General Ledger database according to one example embodiment of the present invention.

FIG. 4 shows an example diagram illustrating queries generated from a logic model in a reconciliation process implemented on a SAP BI platform according to an embodiment of the present invention. A request to reconcile a payroll posting database and a financial General Ledger ("G/L") accounting database invokes logic relations contained in a logic model. Queries in the form of a list of data field names are generated with respect to the payroll database and the G/L accounting database. One example query 402 for payroll database may contain fields of company code (Buksr), posting date of goods receipt or invoice receipt for the purchase order (Budat), document number (Docnum), and general ledger account in G/L accounting (hront). One more example 404 query for financial G/L account database may contain field names of fields of company code (Buksr), posting date of goods receipt or invoice receipt for the purchase order (Budat), document number of goods receipt (belnr), and general ledger account in G/L accounting (hront). The data fields 402 from payroll and data fields 404 in financial G/L may then be reconciled in a comparison of logically related fields.

Figure 5:
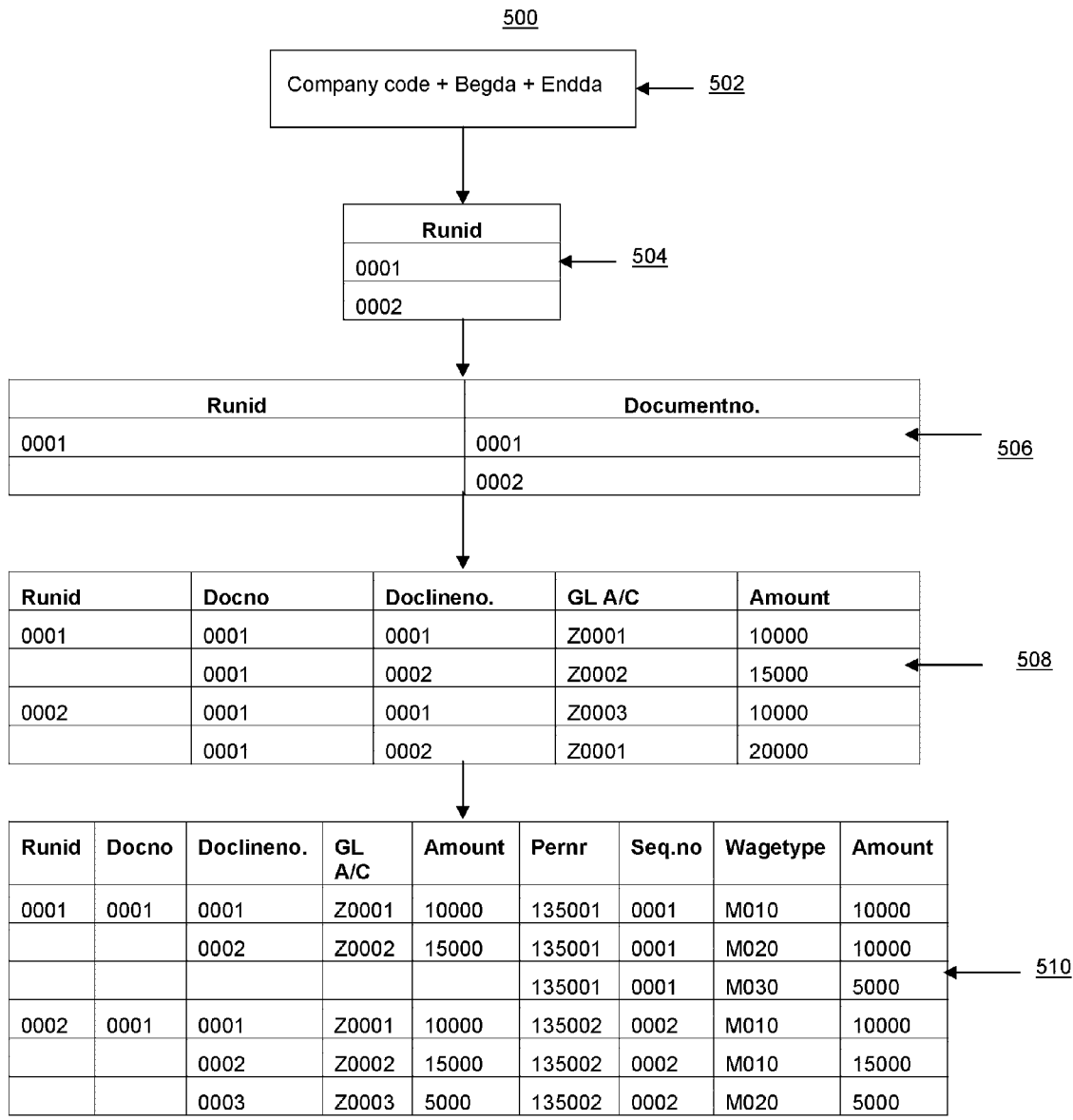
FIG. 5 shows one example dataflow of Human Resource database reconciliation method involving drilling-down from lower to higher levels of detail according to one example embodiment of the present invention.

FIG. 5 shows an example dataflow 500 illustrating levels of detail relating to a payroll database according to an embodiment of the present invention. The top company level 502 may simply specify a company code, a starting date (Begda) and an ending date (Endda). The top company level may be further categorized by payroll runs identified with a payroll run identification number (Runid 504). At a next level of detail 506, Runid may be categorized by posting document number (docno) which may contain a plurality of document posting lines (doclineno). At another level of detail 508, a plurality of Runids are matched with a docno, a plurality of doclineno and a plurality of G/L accounts with corresponding monetary amounts. At another level of detail 510, a plurality of Runids are matched with a docno, a plurality of doclineno and a plurality of G/L accounts with corresponding monetary amounts where line items may be further categorized by sub-amounts according to specific criteria, for example, types of wage (wagetype). Depending on the nature of a query, data fields at each level of detail may be retrieved independently or in conjunction with data fields at other levels of detail.

FIG. 6 shows an example screenshot 600 illustrating reconciliation of different versions of a payroll database according to an embodiment of the present invention. The example payroll posting document 602 on the left is matched by a payroll result database 604 on the right at a level of detail of individual employee wage type. Since the logically related payroll posting document is matched with payroll result, there is no discrepancy between payroll posting document and payroll result.

FIG. 7a shows another example screenshot illustrating reconciliation of different versions of a payroll database according to an embodiment of the present invention. The example payroll results on the right contain one more payroll sequence number for some employees (pernr=135001, 135002) as compared with their corresponding payroll posting document. A comparison of the two versions of payroll at the document posting lines (doclineno) level and a subsequent drill-down at the employee wage type level may reveal that a payroll sequence has not been posted to payroll posting document at the time of reconciliation. An example reason for this discrepancy may be that data for regular pay have been posted, but data for vacation day pay have not been posted yet.

FIG. 7b shows another example screenshot illustrating reconciliation of different versions of a payroll database according to an embodiment of the present invention. The example payroll results on the right contain data for one employee (Pernr=135002) that is not posted in the payroll posting document on the left. This may be a result when the payroll data have not been posted to accounting for the employee (Pernr=135002).

Figure 8:
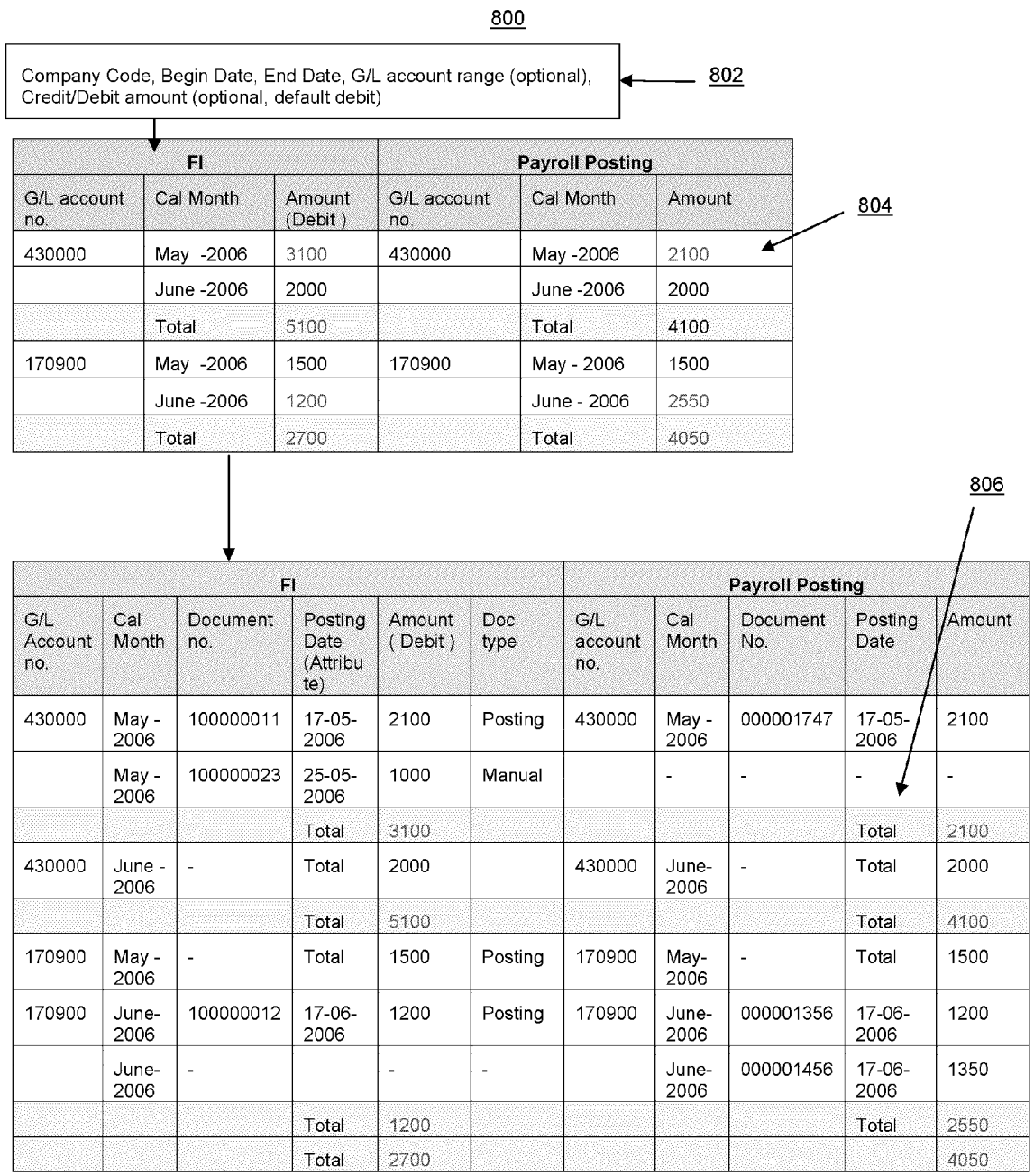
FIG. 8 shows example screen shots of Human Resource database reconciliation system involving a financial database and a payroll posting database according to one example embodiment of the present invention.

FIG. 8 shows example screenshots 800 illustrating reconciliation of a FI database with a payroll posting database according to an embodiment of the present invention. In this embodiment, a query 802 including a list of field names including company code, beginning date, ending date, G/L range and credit/debit amount, is used to retrieve data from a FI database and from a payroll posting database. The retrieved data 804 are first compared for monthly total amounts for each calendar month. If monthly total amounts in FI do not match corresponding amounts in payroll posting database, namely discrepancies exist between these two databases, a drill-down process would generate a new query for retrieving data 806 at another level of detail which may include document number, posting date attribute and document type. In this embodiment, the new level of detail may illustrate the reasons for discrepancies between FI and payroll posting databases. One example reason may be that there may be data manually posted to the FI database which do not have any corresponding data in the payroll posting database. Another example reason may be that some line items created in the payroll posting database have not been posted to the FI database. After locating the reasons for discrepancies, a report may be generated with details that meet auditing or legal reporting requirements.

Figure 9:
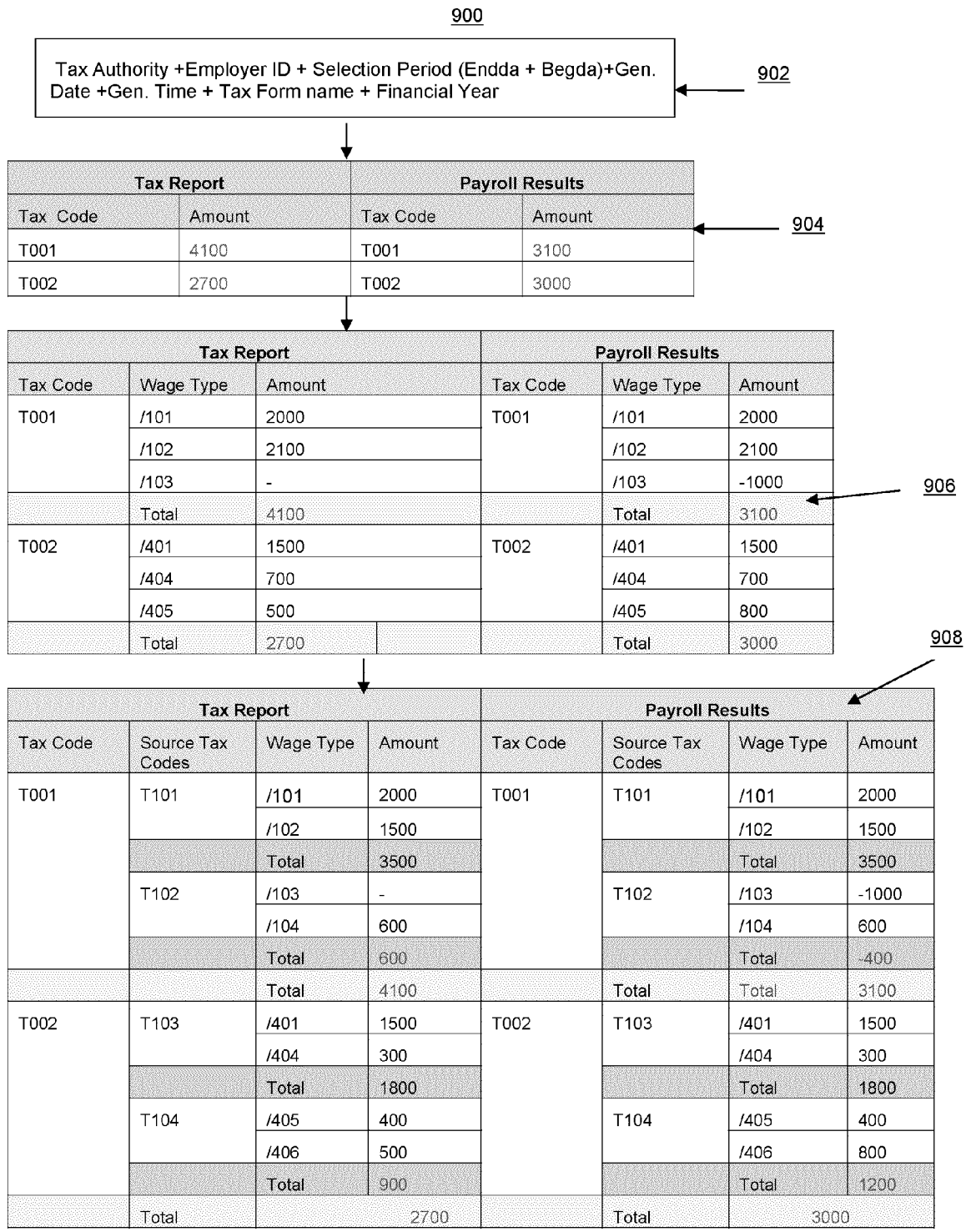
FIG. 9 shows example screen shots of Human Resource database reconciliation system involving a tax report database and a payroll database according to one example embodiment of the present invention.

FIG. 9 shows example screenshots 900 illustrating reconciliation of a tax report with payroll results according to an embodiment of the present invention. In this embodiment, a query 902 containing a list of field names including tax authority, employer identification, selected period from beginning data to ending data, document generating date, document generating time, tax form title and financial year, may be used to retrieve data from tax report and payroll results according to a list of tax codes. When the total amounts retrieved at the level of tax code do not match between tax report and payroll results, namely discrepancies exist between these two databases, a drill-down process may generate a new query for retrieving data 904 at another level of detail which includes employee wage type. In an alternative drill-down example where certain tax codes may be derivatively related to another source of tax codes, a new query including the new source of tax codes may be used to retrieve new data. In this embodiment, the new levels of detail may further illustrate the reasons for discrepancies between tax report and payroll results. One example reason may be that a Retro run, i.e., a payroll run that is performed retroactively, so designed to identify certain events, e.g., absence that is reported after payroll run, was not considered in the tax report After locating the reasons for discrepancies, a tax report may be generated with details that meet auditing or tax authority.

FIG. 10 shows example screenshots 1000 illustrating reconciliation of a FI database with a travel management database according to an embodiment of the present invention. In this embodiment, when a discrepancy is discovered between a FI database and a travel management database at a level for monthly total amounts, a drill-down to document number and post date may reveal when and where the discrepancy is created. After locating the reasons for discrepancies, a report may be generated with details that meet auditing or tax authority requirements.

The various computer systems described herein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Although the present invention has been described with reference to particular examples and embodiments, it is understood that the present invention is not limited to those examples and embodiments. Further, those embodiments may be used in various combinations with and without each other. The present invention as claimed therefore includes variations from the specific examples and embodiments described herein, as will be apparent to one of skill in the art.

What is claimed is:

1. A system for database reconciliation comprising:
    a storage configured to support execution of a database aggregation component for automatically gathering and storing a plurality of databases stored on the storage, wherein the databases are logically related based on information contained in a logic model; and
    a processor configured to support execution of a database reconciliation component, the database reconciliation component including:

a query component configured to retrieve data from at least one data field at a level of detail from the plurality of databases;

a comparator component configured to compare data retrieved from a first database of the plurality of databases with data retrieved from a second database of the plurality of databases at the level of detail; and a drill-down component configured to, if there is a discrepancy in the results of a database comparison, recursively invoke the query component and the comparator component at a higher level of detail until a stop condition is met.

2. The system of claim 1, further comprising:

a reporting component configured to automatically generate reports relating to the database comparison results.

3. The system of claim 1, wherein the stop condition is the exhaustion of levels of detail.

4. The system of claim 1, wherein the stop condition is that the discrepancy is traced to a selected level of detail.

5. The system of claim 1, wherein the database aggregation component comprises at least one database containing payroll information.

6. The system of claim 1, wherein the database aggregation component comprises at least one database containing tax information.

7. The system of claim 1, wherein the database aggregation component comprises at least one database containing accounting information.

8. The system of claim 1, wherein the database aggregation component comprises at least one database containing travel information.

* * * * *